Sept. 26, 1967  A. I. ANDERSON ET AL  3,343,888
HOPPER ARRANGEMENT FOR PNEUMATICALLY UNLOADABLE CONTAINERS
Filed June 9, 1966  2 Sheets-Sheet 1

INVENTORS
Arthur I. Anderson
Keith F. Solimar

BY Scofield, Kokjer, Scofield & Lowe
ATTORNEYS

Sept. 26, 1967  A. I. ANDERSON ET AL  3,343,888
HOPPER ARRANGEMENT FOR PNEUMATICALLY UNLOADABLE CONTAINERS
Filed June 9, 1966  2 Sheets-Sheet 2
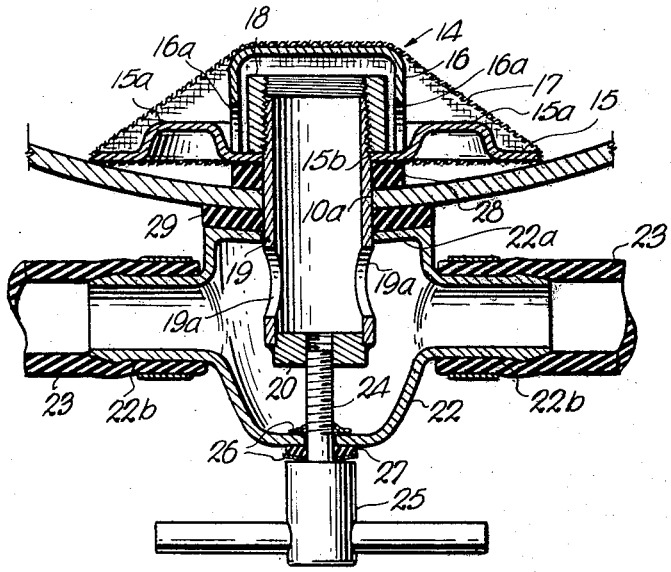
Fig. 3.
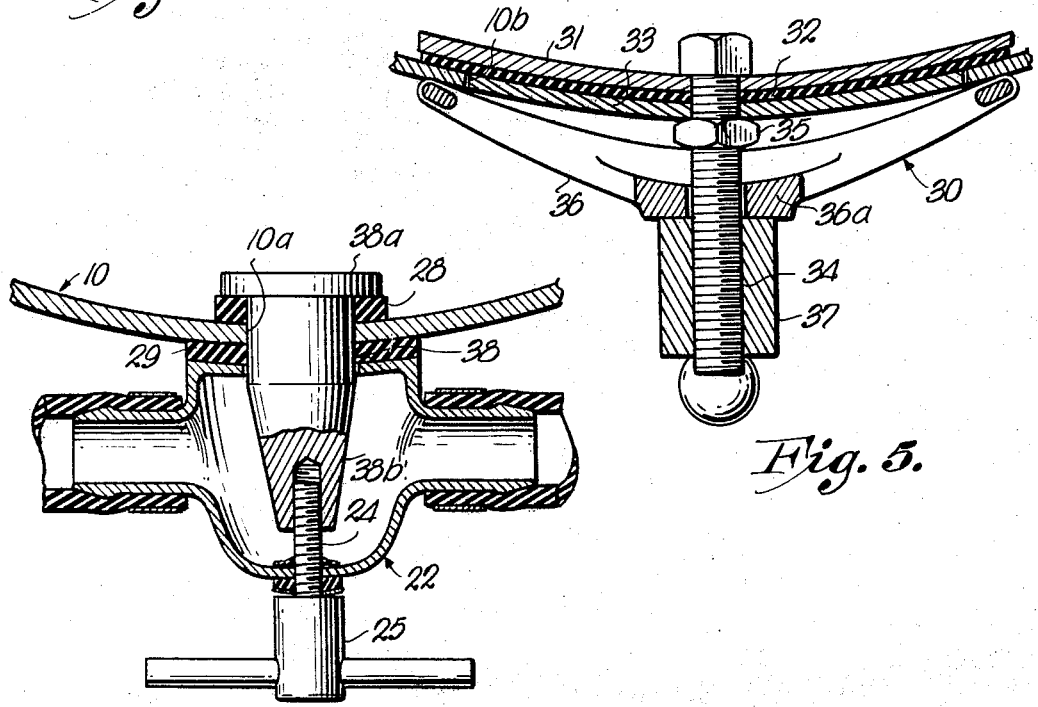
Fig. 5.
Fig. 4.
INVENTORS
Arthur I. Anderson
Keith F. Solimar
BY Scofield, Kokjer, Scofield & Lowe
ATTORNEYS

United States Patent Office 3,343,888
Patented Sept. 26, 1967

3,343,888
HOPPER ARRANGEMENT FOR PNEUMATICALLY UNLOADABLE CONTAINERS
Arthur I. Anderson, St. Paul, and Keith F. Solimar, Minneapolis, Minn., assignors to Butler Manufacturing Company, Kansas City, Mo., a corporation of Missouri
Filed June 9, 1966, Ser. No. 556,356
5 Claims. (Cl. 302—52)

This invention relates to trailer tanks and other containers designed to carry or store bulk material and refers more particularly to improvements in means for mounting and removing air diffuser elements within the hopper portions of same and for converting the tank from solids to liquids.

One of the principal objects of the invention is to provide a hopper and aeration fitting construction which enables the air diffuser elements to be quickly removed and either replaced with clean ones or replaced with hopper plugs which will again seal the hopper and enable it to function to retain either solids or liquids as may be desired. A feature of the invention resides in the provision of means of entry to the hopper to effect the diffuser removal or replacement whereby to permit a workman to remove or replace the elements working at ground level and to plug the hopper if they are not replaced without requiring that he enter the interior of the tank proper.

Another important object of the invention is to provide an external aeration fitting arrangement which serves not only as a part of the aeration system but also provides the means for securing the internal diffuser elements and the interchangeable hopper plugs in position within the hopper. In the invention, the fittings are connected and disconnected with the hopper and other components through manipulation of a single hand bolt.

Other and further objects of the invention, together with the features of novelty appurtenant thereto, will appear in the course of the following description.

In the accompanying drawings which form a part of the specification and are to be read in conjunction therewith, and in which like reference numerals indicate like parts in the various views;

FIG. 3 is an enlarged sectional view taken along line 3—3 of FIG. 1 in the direction of the arrows.

FIG. 4 is a view similar to FIG. 3, but showing the hopper in the plugged condition with the air diffuser removed from the interior thereof; and FIG. 5 is an enlarged fragmentary sectional view taken along line 5—5 of FIG. 1 in the direction of the arrows.

Figure 1:
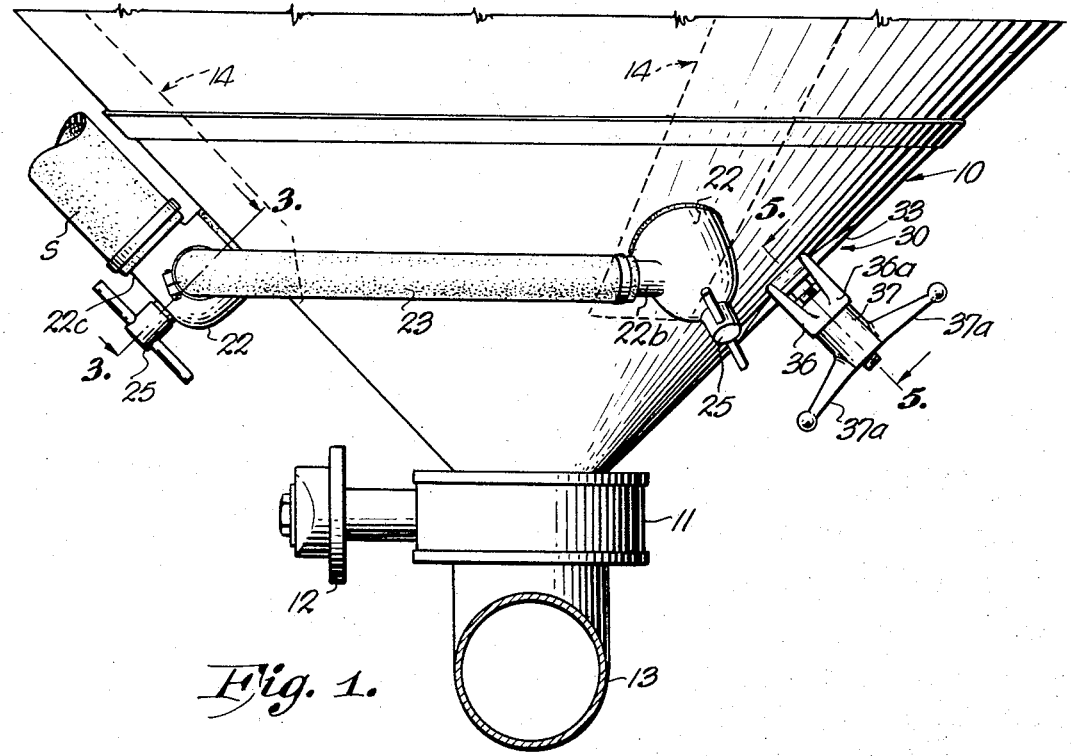
FIG. 1 is a fragmentary side elevational view of the bottom portion of a tank hopper equipped with the invention.

Referring to the drawings, the inventive structure is primarily, although not exclusively, designed for use in connection with a vehicular tank transport of the nature described in prior Patent 3,152,842. In that patent, a horizontal transport tank is provided along its length with a plurality of bottom hoppers, each of which is fitted with internal product aeration components. The over-all air system is described in the patent, as are the principals of aeration and reference may be had thereto if any further information is desired. The present invention is limited to the hopper portion of the tank.

Figure 2:
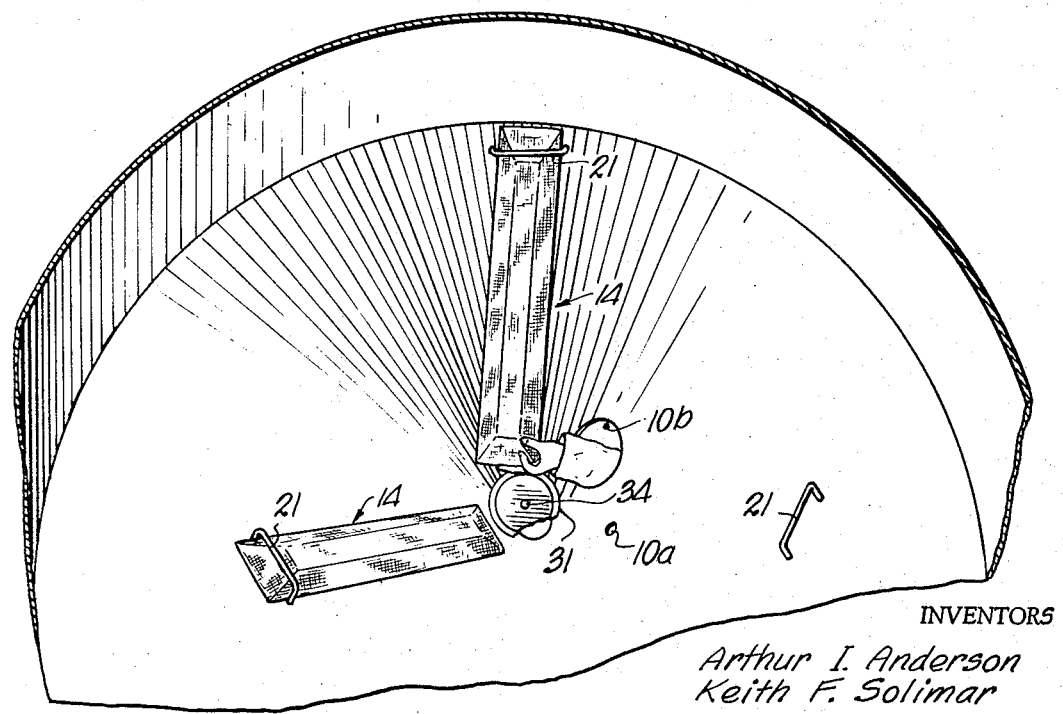
FIG. 2 is a fragmentary sectional view looking downwardly and inside the hopper and illustrating the manner of removal of the air diffuser.

In FIGS. 1 and 2 of this application, we have shown a single hopper 10. The hopper is fitted at the bottom with a discharge valve 11 having the control means 12. Below the valve is located a transverse pneumatically fed discharge line 13 into which product is delivered from the hopper under control of valve 11.

For handling of dry products which flow best with aeration, provided within the hopper is a plurality of elongate air diffusers of the nature shown at 14 in FIGS. 1 and 2, and in cross section in FIG. 3. Each diffuser comprises an elongate rectangular base plate 15 with the parallel strengthening ribs 15a formed therein along the length thereof. Mounted on top of the base plate is an inverted channel 16 whose side legs are apertured as at 16a at intervals along its length so as to permit free air flow from within to the exterior of the channel. An air permeable cover 17, such as for example a fabric or porous metal, envelops the entire base plate-channel assembly with portions of the fabric stretched between the side edges of the channel top and base plate through which air enters the hopper.

Each diffuser 14 further includes adjacent one end and within the channel 15 a cylindrical air fitting 18 which is internally threaded and is seated on the base plate to which it is welded or otherwise permanently secured. An opening 15b in the base plate of substantially equal diameter with the inside diameter of the fitting registers therewith and the fabric is likewise apertured at this point. Inserted through this opening and threaded into fitting 18 is a conduit or pipe 19 having a plug or head 20 at its outer end and provided with wall openings 19a near the plug.

Each diffuser 14 is removably held in place at its inner end within the hopper by means of a loop 21 formed within the inside wall of the hopper and through which the upper end of the diffuser can be freely inserted. The loop 21 can be constructed of rod stock bent into an arch shape and welded at its ends to the hopper wall. The lower ends of the diffusers are respectively secured in place by means now to be described.

Referring particularly to FIGS. 1 and 3, associated with the left hand diffuser of FIG. 3 on the exterior of the hopper is a hollow generally bell shaped housing 22 having an apertured bottom 22a and two opposed projecting nipples 22b forming passageways which communicate with the interior of the housing. These nipples have clamped thereon the air hoses 23 which lead to castings 22' spaced equiangularly around the hopper. In addition, casting 22 has the main connector or nipple 22c to which is clamped the hose S from a source (not shown) of pressurized air.

The housings 22' (only one is seen in FIG. 1 since the other is on the other side of the hopper) differ from housing 22 in only two respects. First, they have only one hose nipple 22'b. Secondly, they do not include the main connector like that shown at 22c on the housing 22.

Extending through an opening in the dome of each housing 22, 22' is a hand bolt 24 having the T-head 25 for manual turning of the bolt. The bolt is supported for rotation on its own axis as for example by washers 26 and ring gaskets 27. Internally of the housing the bolt is threadedly connected with the plug 20 in conduit 19 through the medium of a tapped aperture in the plug. As shown, the conduit 19 projects from inside the hopper through an opening 10a therein and extends into the housing through an opening in the bottom 22a thereof. To provide a seal around opening 10a, there is an internal gasket 28 and an external gasket 29, both of which are annular in shape and surround the member 26. These gaskets are of rubber or other resilient material so that when bolt 24 is rotated to draw the diffuser toward the hopper wall, they will be compressed between base plate 15 of the diffuser, the hopper wall and base 22a of housing 22, respectively.

From the description thus far given, it will be understood that there is thus provided an air flow path through the housings 22, 22' to the interior of the respective diffuser elements 14 associated therewith and from thence through the fabric cover into the interior of the hopper. Air is supplied through the main line S to housing 22 and a portion is diverted through the branch lines 23 to housings 22'.

Access to the interior of the hopper is provided by means of a circular access door 30 which is detailed in cross section in FIG. 5. The door comprises a curviform inner plate 31 of sufficient diameter to overlap the margins of an opening 10b provided in the hopper wall. On its inner face, plate 31 carries a rubber or other resilient gasket 32 of substantially the same diameter as the plate so that the margin of the gasket is interposed between the margin of the plate and the margin of the inside wall of the hopper around the opening. The gasket is retained in place by a filler plate 33 of substantially the same diameter as the diameter of the opening. The plate 33 is received on a threaded bolt 34 secured centrally to the inner plate 31 and over which both the gasket and filler plate are sleeved and held in place by a nut 35.

Spanning the opening 10b on the exterior of the hopper is a bridge member 36 having a central apertured web portion 36a through which the bolt 34 extends. Threadedly received on the outer end portion of the bolt is a hub 37 having the opposed turning arms 37a extending substantially radially from it. The access door is tightened in position by drawing down securely on the bridge member in order to supply an outward thrust on the bolt.

Access to the interior of the hopper is obtained by backing the hub 37 off the bolt 34 so that the bridge member 36 can be slipped free also. As shown in FIG. 2, the door can then be moved inwardly and temporarily placed on the bottom of the hopper.

The inner diffuser elements 14 are loosened from their connection with the exterior housings 22, 22' by backing the bolts 24 free from connection with the conduit 19 of the diffuser. Once the bolt 24 has been unthreaded from the plug 20, the diffuser is free at its lower end. The conduit can be withdrawn from the opening 10a in the hopper, the diffuser slipped out from under the loop 21 and the diffuser as a whole removed through the opening 10b.

Care is taken to insure that the access opening 10b is of sufficient diameter as to permit withdrawal of the diffuser elements therethrough. Each diffuser is disconnected in the same way as described earlier.

To reseal the diffuser openings 10a, plugs 38 having the shape shown in FIG. 4 can be inserted through the access opening 10b and then inserted from within the hopper outwardly through the diffuser openings. These plugs are simply solid metal elements having a circular main body, an internal flanged head 38a and a tapered conical portion 38b which is tapped at its outer end to receive the bolt 24. The gaskets 28 and 29 are associated with the plug. The housings 22, 22' are repositioned and upon engagement of the bolts 24 with the plugs and tightening of these bolts to draw the plugs outwardly, the plugs will securely seal the openings. The tapered portion of the plug is provided to assist in quickly locating the opening and starting the plug through it from the interior of the hopper.

Once the plugs are in, the access door is replaced and tightened by rotation of the hub 37.

If simple replacement of the diffusers is required rather than plugging, it will be obvious that one simply places a new or clean diffuser element into the hopper through the access opening 10b, slips it under the retaining loop 21 at the upper end and inserts the inlet conduit 19 back through the opening 10a. The housing is replaced and the assembly completed by engaging the bolt 24 with the plug 20 in the end of the conduit.

From the foregoing, it will be seen that this invention is one well adapted to attain all of the ends and objects hereinabove set forth together with other advantages which are obvious and which are inherent to the structure.

It will be understood that certain features and sub-combinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings, is to be interpreted as illustrative and not in a limiting sense.

Having thus described our invention, we claim:

1. In a hopper construction for pneumatically unloadable containers, the combination of:
    a hopper wall terminating in a bottom outlet,
    at least one air diffuser element located within said hopper adjacent said wall, said diffuser element having an air inlet pipe projecting externally of the hopper through a first opening in the hopper wall,
    a housing removably fitted over the projecting portion of said pipe,
    means for supplying air to the interior of said housing,
    said pipe having an aperture therein communicating with the interior of said housing whereby air can flow from said housing through said aperture into said pipe and thence into said diffuser element,
    resilient sealing means positioned around said pipe adjacent said opening in the hopper wall whereby to seal against leakage of air through said opening around said pipe,
    detachable thrust means interconnecting said housing and pipe, including means operable from the exterior of the housing for effecting disconnection of said thrust means,
    a second opening in said hopper of a size sufficient to permit removal therethrough of said diffuser element when disconnected,
    a removable closure for said second opening, and
    means exteriorly of the hopper connected with said closure for detachably retaining the closure in closing position with respect to said second opening.

2. The combination as in claim 1, including:
    plug means for said first opening interchangeable with said air inlet pipe upon removal of the diffuser element, said plug means including structure operable to couple with said thrust means.

3. The combination as in claim 1:
    said thrust means including a threaded bolt journaled in said housing and operable from the exterior of the housing.

4. The combination as in claim 1:
    said diffuser element comprising an elongate member extending upwardly along the hopper wall with said pipe near its lower end, and
    arch means connected with said hopper wall near the upper end of said diffuser element and forming a loop through which said upper end is inserted.

5. The combination as in claim 1, including:
    an additional air diffuser element spaced around the interior of said hopper from the first named diffuser element,
    said additional diffuser element having associated therewith an air inlet pipe, housing, sealing means and detachable thrust means of the character defined in claim 1, and
    air conducting means interconnecting the interior of said first named diffuser element with said additional diffuser element.

References Cited
UNITED STATES PATENTS

| | | | |
|---|---|---|---|
| 3,034,835 | 5/1962 | Kauffman et al. | 302—53 |
| 3,138,409 | 6/1964 | Green et al. | 302—52 |
| 3,152,842 | 10/1964 | Anderson et al. | 302—53 |

ANDRES H. NIELSEN, *Primary Examiner.*